US009684573B2

(12) United States Patent
Manmohan et al.

(10) Patent No.: US 9,684,573 B2
(45) Date of Patent: Jun. 20, 2017

(54) DISMOUNTING A STORAGE VOLUME

(75) Inventors: Sarin Sumit Manmohan, Pune (IN); Manav Laxmikant Deshmukh, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 260 days.

(21) Appl. No.: 12/770,577

(22) Filed: Apr. 29, 2010

(65) Prior Publication Data
US 2011/0271069 A1    Nov. 3, 2011

(51) Int. Cl.
*G06F 12/02* (2006.01)
*G06F 11/20* (2006.01)

(52) U.S. Cl.
CPC ...... *G06F 11/2028* (2013.01); *G06F 11/2046* (2013.01); *G06F 11/2038* (2013.01); *G06F 2201/825* (2013.01)

(58) Field of Classification Search
USPC ................... 711/153, 160, E12.094
See application file for complete search history.

(56) References Cited

U.S. PATENT DOCUMENTS

| 7,409,389 | B2 * | 8/2008 | Ananthanarayanan et al. |
| 2004/0093359 | A1 | 5/2004 | Sharpe et al. |
| 2004/0098724 | A1 * | 5/2004 | Demsey et al. ............. 718/104 |
| 2004/0111389 | A1 * | 6/2004 | Pudipeddi et al. ... G06F 9/4411 |
| 2005/0228832 | A1 * | 10/2005 | Ghotge et al. ...... G06F 11/0727 |
| 2007/0038888 | A1 | 2/2007 | Kariv |
| 2009/0327367 | A1 * | 12/2009 | Mehra et al. ................. 707/205 |
| 2010/0077160 | A1 * | 3/2010 | Liu et al. ..................... 711/162 |

FOREIGN PATENT DOCUMENTS

| CN | 1495637 A | 5/2004 |
| CN | 1866211 A | 11/2006 |
| CN | 102077193 A | 5/2011 |
| JP | 2001134844 A | 5/2001 |
| JP | 2001188700 A | 7/2001 |

OTHER PUBLICATIONS

Gardner, WD "Targeting high-performance computing applications, the software aims to bring technical computing to the masses." InformationWeek.com, Jun. 9, 2006, 2 pages.
Japanese Office Action issued by the Japanese Patent Office for Application No. P2013-508106 mailed on May 27, 2014 (2 pages).
Chinese Office Action issued by the State Intellectual Property Office of the People's Republic of China for Chinese Application No. 2011800215830 dated May 6, 2015 (13 pages).
Chinese Office Action issued by the State Intellectual Property Office of the People's Republic of China for Chinese Application No. 2011800215830 dated Jan. 18, 2016 (26 pages).

* cited by examiner

*Primary Examiner* — Charles Rones
*Assistant Examiner* — Ryan Dare
(74) *Attorney, Agent, or Firm* — Wilmer Cutler Pickering Hale and Dorr LLP

(57) ABSTRACT

In response to an instruction to dismount a storage volume, for example, an object in the storage volume is identified and a handle that references the object is closed. Once an exclusive lock on the storage volume is acquired, the storage volume can be dismounted. The storage volume can then be remounted.

23 Claims, 6 Drawing Sheets

DISMOUNTING A STORAGE VOLUME

BACKGROUND

In a clustered network (e.g., a server cluster), multiple entities (e.g., computer systems and applications running on those systems) may each access the same storage volume. Some of those applications—referred to herein as primary applications—are to be made highly available. The rest of the applications are referred to herein as secondary applications.

For any of a variety of reasons, a primary application may become unavailable. For example, the server on which the application is executing may become unavailable, in which case the application is also unavailable until the server is restored to service. To resolve this situation, the application is restarted on a different server as quickly as possible, a process referred to as failover.

To transfer execution of the primary application from one server to another, the storage volume used by that application is dismounted (essentially, the storage volume is taken offline), then remounted (essentially, it is brought online and again made available to the application, now executing on the second server). To dismount the storage volume, an exclusive lock on the storage volume should be acquired. However, it may not be possible to acquire the exclusive lock if one or more of the secondary applications are continuing to access the storage volume.

Conventionally, the shared storage is dismounted forcefully under such circumstances. This often leads to inconsistent data in the file system. As a result, an administrator has to either manually or automatically run a program such as "chkdsk" to identify and repair errors. If chkdsk is unable to repair the storage volume, then the storage volume is not remounted, which increases downtime and hence decreases the availability of the primary application.

In some clustered network implementations, cluster software can be used to control the start and stop of a primary application so that the primary application will not interfere with an attempt to acquire an exclusive lock. However, the secondary applications may not be under the control of the cluster software and so may have open files in the storage volume. Under those circumstances, the secondary applications might fail to dismount from the storage volume or the dismount may be done forcefully, which may result in write errors that in turn might lead to the file system being inconsistent.

SUMMARY

In one embodiment, in response to an instruction to dismount a storage volume, an object in the storage volume is identified and a handle that references the object is closed. Once an exclusive lock on the storage volume is acquired, the storage volume can then be dismounted.

In another embodiment, in response to a failed first attempt to acquire an exclusive lock on a storage volume, an internal handle table for a process is accessed. An entry in the internal handle table that references the storage volume is identified, and a handle corresponding to the entry is closed. Then, another attempt is made to acquire the exclusive lock on the storage volume. If successful, the storage volume can be dismounted.

More specifically, in one embodiment, the volume file buffer is flushed so that all the cached data is written to the storage volume. An attempt may then be made to acquire an exclusive lock on the storage volume. If the attempt to acquire an exclusive lock fails, it indicates that there is at least one application/process that is still accessing the storage volume, in which case the following operations are performed. The internal handle table for each process in the system is accessed, to identify objects that are opened by the process. For each entry in the internal handle table for each process, the type of the object represented by the entry is identified. Specifically, entries identified as type "file" are identified. For each file type of object, the name of the object (e.g., the file path of the open file handle) is determined. In one embodiment, the granted access permissions (e.g., read mode, write mode, or read/write mode) are also determined. If the name of the object corresponds to a file on the storage volume that is to be dismounted, then the open handle is closed on behalf of the application/process. The corrective actions mentioned above may be logged for possible future reference. Then, the volume file buffer is flushed again, and another attempt is made to obtain an exclusive lock on the storage volume. The operations just described can be repeated until an exclusive lock is acquired. Once an exclusive lock is obtained for the storage volume, the volume can be dismounted. The volume can then be remounted.

Thus, according to embodiments of the present disclosure, a primary application is stopped before a shared volume can be dismounted so that an application can be stopped on a node/system and restarted on another node/system without corrupting the file system. Before dismounting the storage volume and after stopping the primary application, if there are any secondary applications/processes accessing the volume, then their active handles are closed and the volume file buffer is flushed so that the file system remains consistent after the failover. Embodiments according to the present disclosure can be used in physical and virtual environments. In addition to failover, embodiments according to the present disclosure can be used for disaster recovery.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
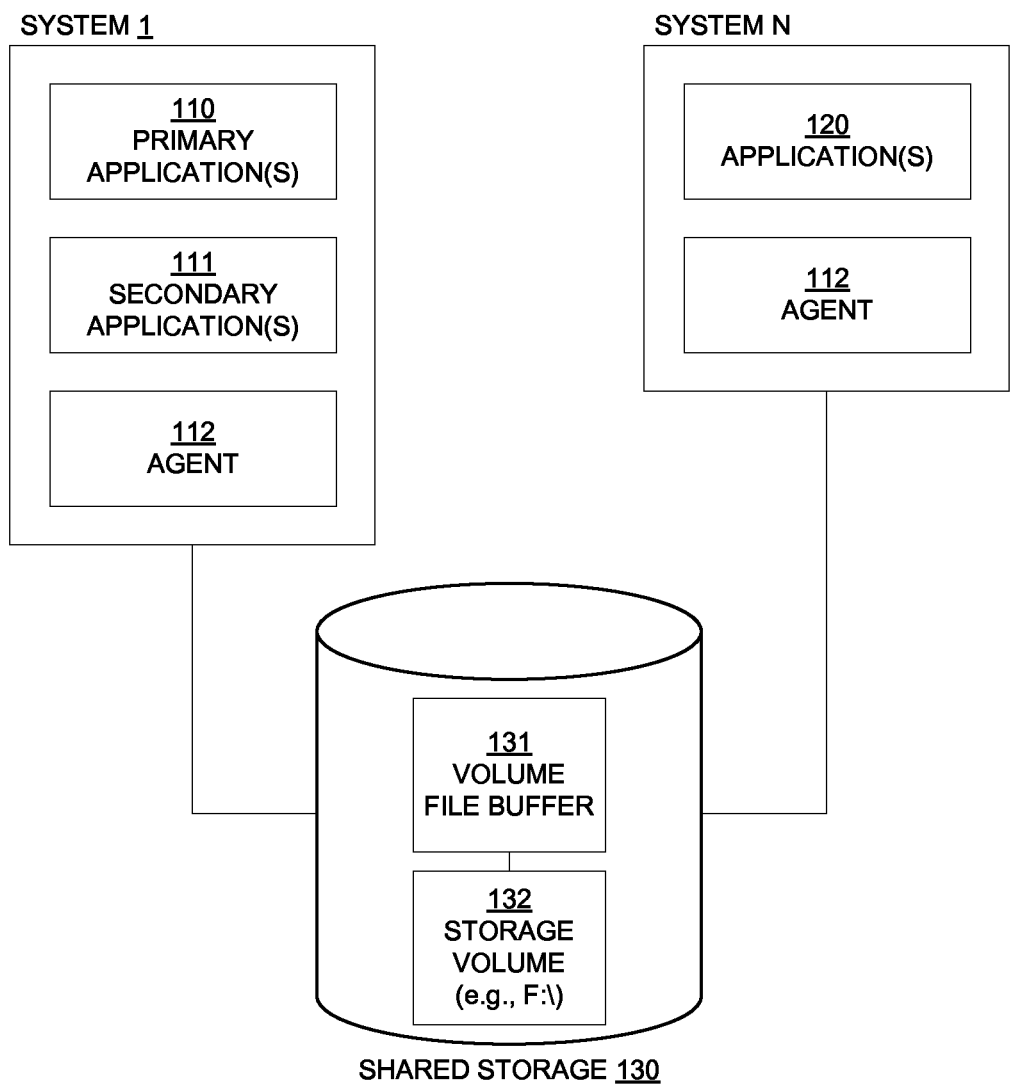
FIG. 1 is a block diagram depicting elements of an example of a clustered network upon which embodiments according to the invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "closing," "acquiring," "dismounting," "(re)mounting," "(re)naming," "writing," "attempting," "accessing," "determining," "recording," "causing," "indicating," or the like, refer to actions and processes (e.g., flowcharts 600, 700, and 800 of FIGS. 6, 7, and 8, respectively) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In overview, embodiments according to the present disclosure provide methods and systems to gracefully dismount and mount a shared storage volume so that execution of an application can be moved from one system or node to another without corruption of the file system. Before dismounting the volume, if there are any applications accessing the volume, then their active handles are closed and the volume file buffer is flushed so that the file system remains consistent subsequent to the failover.

FIG. 1 is a block diagram depicting elements of an example of a clustered network 100 upon which embodiments according to the invention can be implemented. In the example of FIG. 1, the network includes N (e.g., 32) nodes or systems (e.g., computer systems or servers), each coupled to shared storage 130. The network 100 may be referred to as a high availability cluster (HAC) that improves the availability of services (e.g., applications) by providing the ability to move (e.g., failover) those services from one node to another in response to a planned event (e.g., for maintenance, upgrades, patches) or an unplanned event (e.g., a node becomes inoperative unexpectedly). Those services can include, for example, databases, file sharing, and electronic commerce.

To achieve high availability, cluster software can be used to monitor the statuses of the applications and the nodes/systems, and to automatically move execution of the applications from one system to another in response to a planned or unplanned event. In the example of FIG. 1, the cluster software includes an agent 112 that runs on each of the N systems. The agent 112 can monitor the applications running on each system and can trigger operations associated with starting, stopping, and moving execution of applications that are monitored and controlled by the cluster software.

Not all of the applications executing on the systems 1, . . . , N may be monitored and/or controlled by the cluster software. For ease of discussion, applications monitored and controlled by the cluster software are referred to herein as primary applications, and the other applications are referred to as secondary applications. For example, the primary applications may be high availability applications (applications for which a high level of availability is needed or wanted).

In the example of FIG. 1, shared storage 130 is a data storage system that may include one or more physical storage devices such as one or more physical disks, LUNs (Small Computer System Interface (SCSI) logical units), or other types of hardware used to store data. The storage volume 132 represents one or more volumes (blocks) of data that may be on a single physical disk or may be spread across multiple physical disks (referred to as a virtual disk) under control of a volume manager (not shown). The storage volume 132 can include a volume file buffer 131 that buffers data before the data is written to the storage volume 132. The storage volume 132 can be accessed by the primary application(s) 110 and secondary application(s) 111 executing on system 1.

Figure 2:
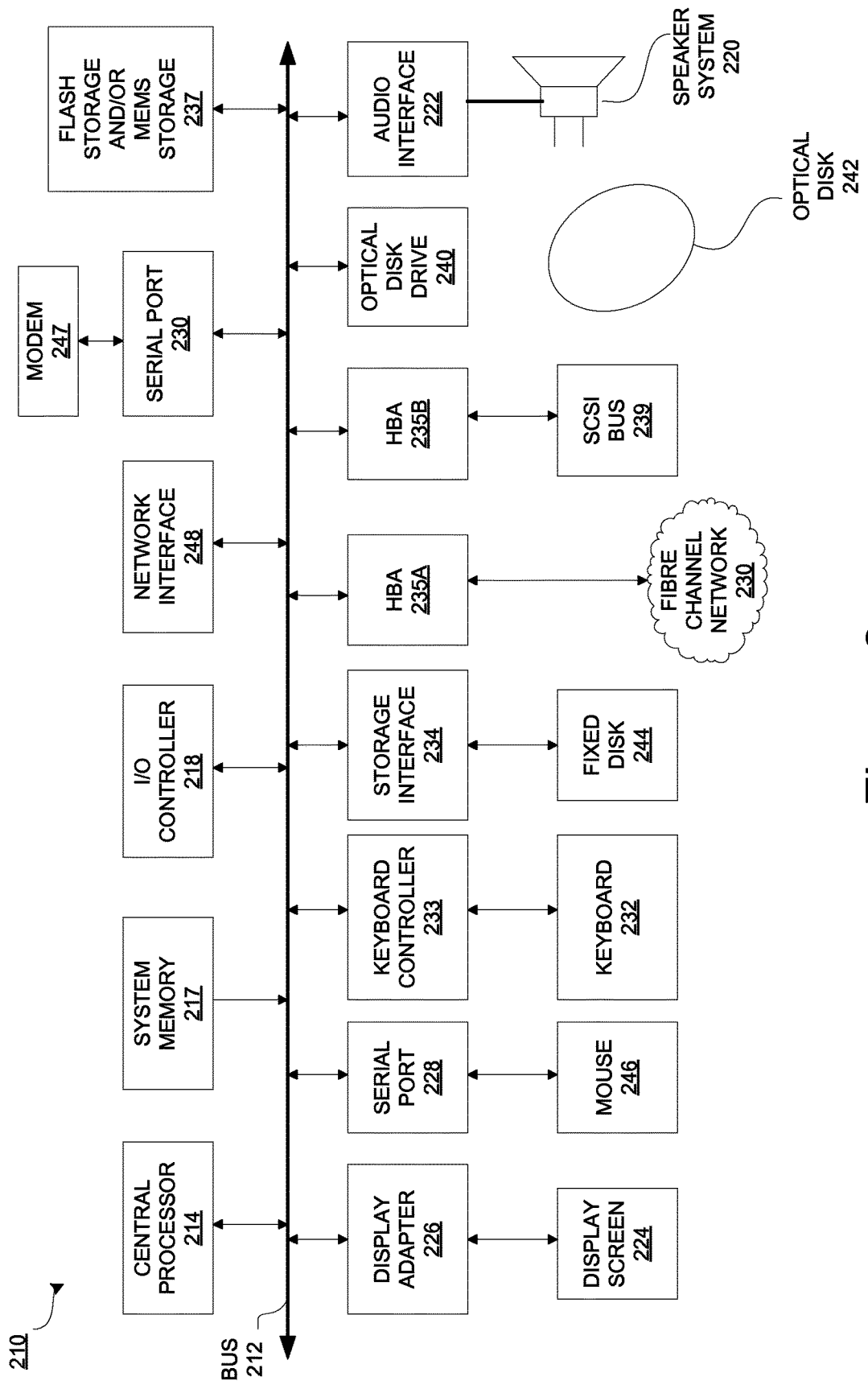
FIG. 2 is a block diagram depicting an example of a computer system upon which embodiments according to the invention can be implemented.

FIG. 2 depicts a block diagram of a computer system 210 suitable for implementing the present disclosure. In the discussion to follow, various and numerous components and elements are described. Various combinations and subsets of those components can be used to implement the devices mentioned in conjunction with FIG. 1. For example, the systems 1, ..., N may each be a full-function computer system that employs many if not all of the features of the computer system 210, or they may utilize only the subset of those features needed to support the functionality provided by those devices. For example, servers may not need a keyboard or display, and may execute a relatively sparse operating system that supports the functionality of data storage and data access and the management of such functionality.

In the example of FIG. 2, the computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a SCSI bus 239 (alternatives to SCSI include Integrated Development Environment (IDE) and Serial Advanced Technology Attachment (SATA)); and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity to the network 100 of FIG. 1.

The bus 212 of FIG. 2 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident in the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via the network modem 247 or the interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 2) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of the system memory 217, fixed disk 244, optical disk 242, or floppy disk 238. The operating system provided on the computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

As mentioned above, embodiments according to the present disclosure provide methods and systems to gracefully dismount and mount a shared storage volume so that an application can be stopped on one system and restarted on another without corrupting the file system. Where the discussion below refers to a single application, that discussion can be readily extended to multiple applications.

Figure 3A:
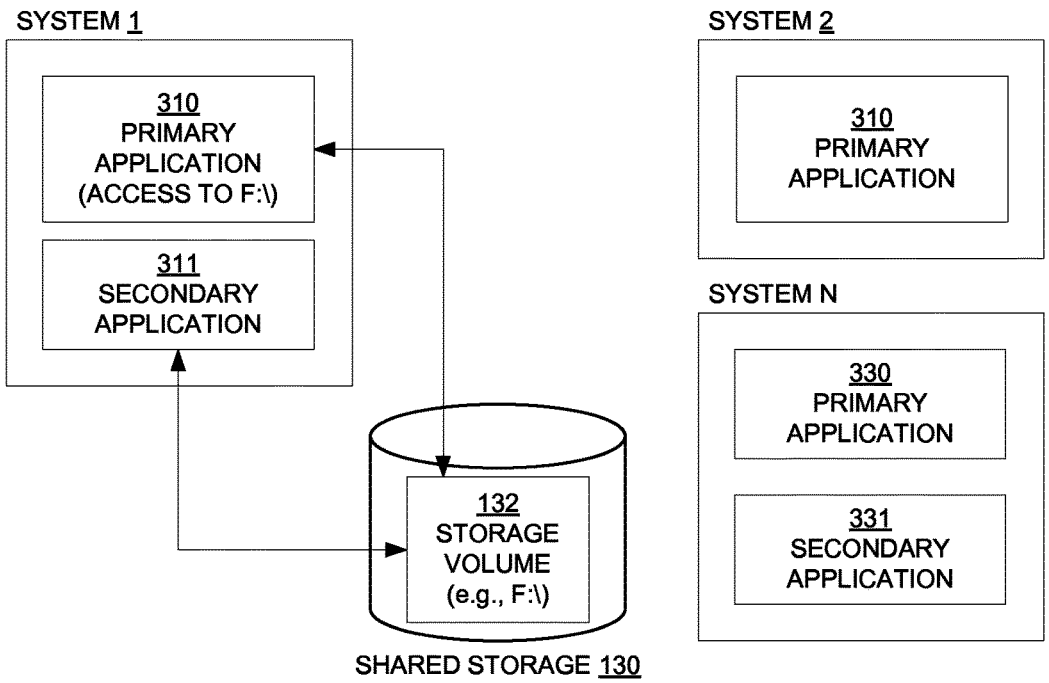
FIGS. 3A, 3B, and 3C are block diagrams depicting dismounting/mounting of a storage volume according to an embodiment of the invention.

With reference first to FIG. 3A, a primary application 310 and a secondary application 311 are executing on system 1. In the example of FIG. 3A, the applications 310 and 311 can read and/or write data from and to the storage volume 132 (e.g., the volume name "F:\"). Of particular interest are applications that write data to the storage volume 132, but the present disclosure is not limited to applications of that type. Note that the applications 330 and 331 cannot access the shared storage volume 132 while it is mounted on system 1—those applications can access the shared storage volume 132 once it is dismounted from system 1 and mounted on system N.

Figure 3B:
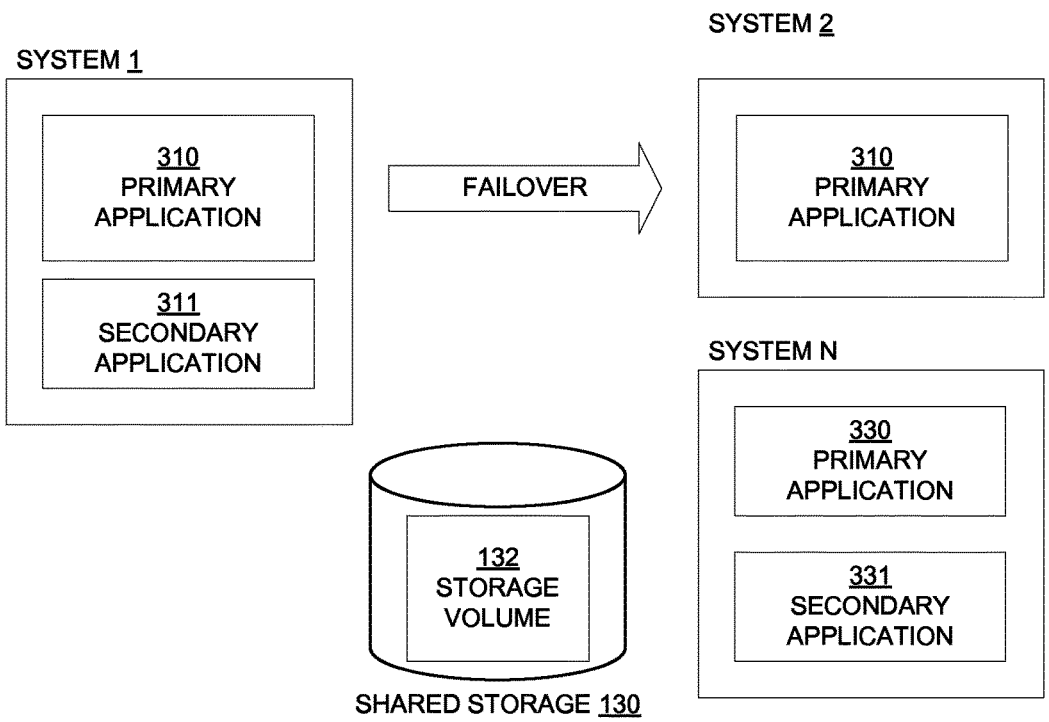

In the example of FIG. 3B, a decision is made to stop executing the primary application 310 on system 1 and to start executing the redundant primary application 310 on system 2. In other words, a decision is made to failover the primary application 310 from system 1 to system 2. As mentioned above, this decision may be the result of a planned or unplanned outage. To failover the primary application 310, that application, as well as the other applications using storage volume 132 (the same storage volume used by the primary application 310), are shut down so that the storage volume 132 can be subsequently dismounted.

Figures 5, 6:
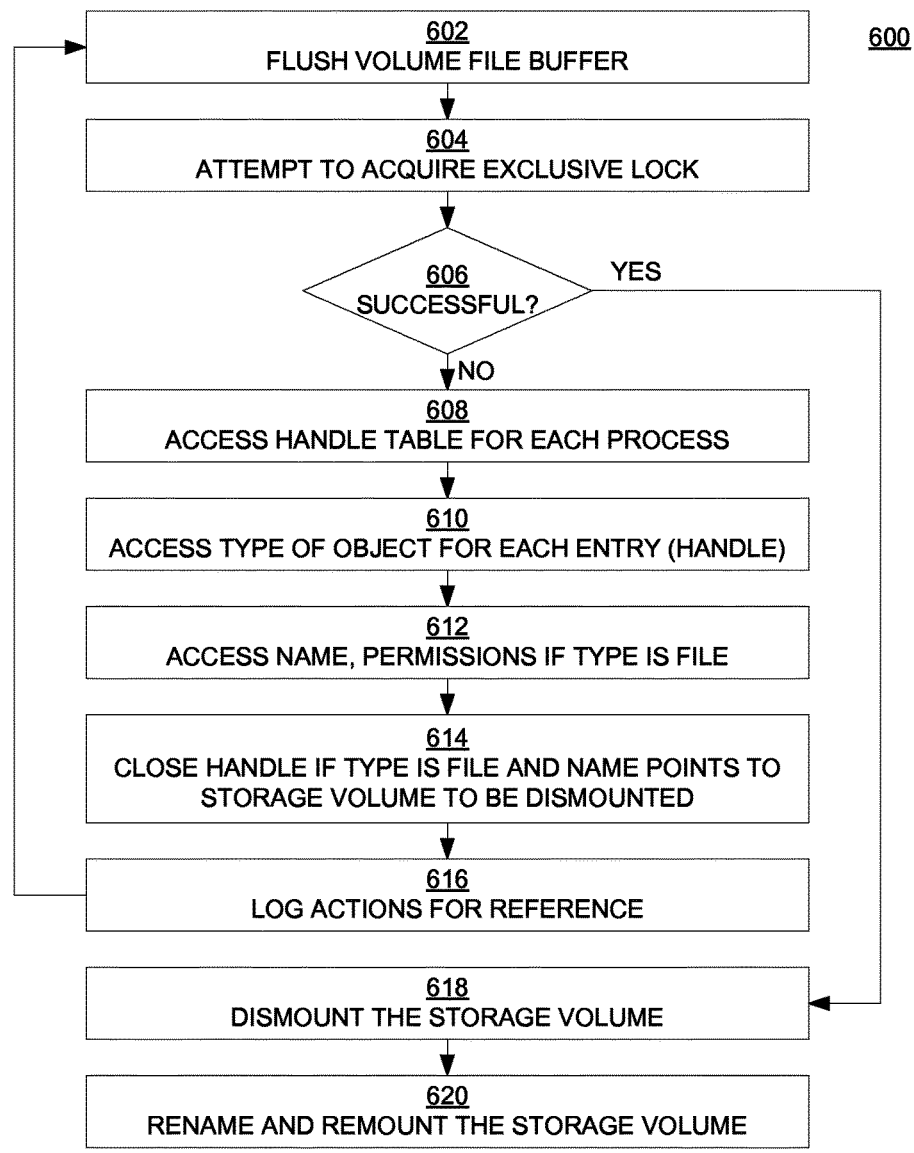
FIG. 5 is an example of a handle table according to an embodiment of the invention.
FIG. 6 is a flowchart of a computer-implemented process for dismounting and remounting a storage volume according to an embodiment of the invention.

The primary applications 310 can be shut down by the cluster software (e.g., the agent 112 of FIG. 1). However, as mentioned previously herein, the secondary application 311 is not under control of the cluster software. In order to shut down the secondary application 311, in one embodiment, the method described below in conjunction with FIG. 6 is used.

Continuing with reference to FIG. 3B, after the primary and secondary applications with access to the storage volume 132 are shut down, that storage volume 132 can be dismounted. Once those operations are performed, the primary application 310 can failover from system 1 to system 2.

Figure 3C:
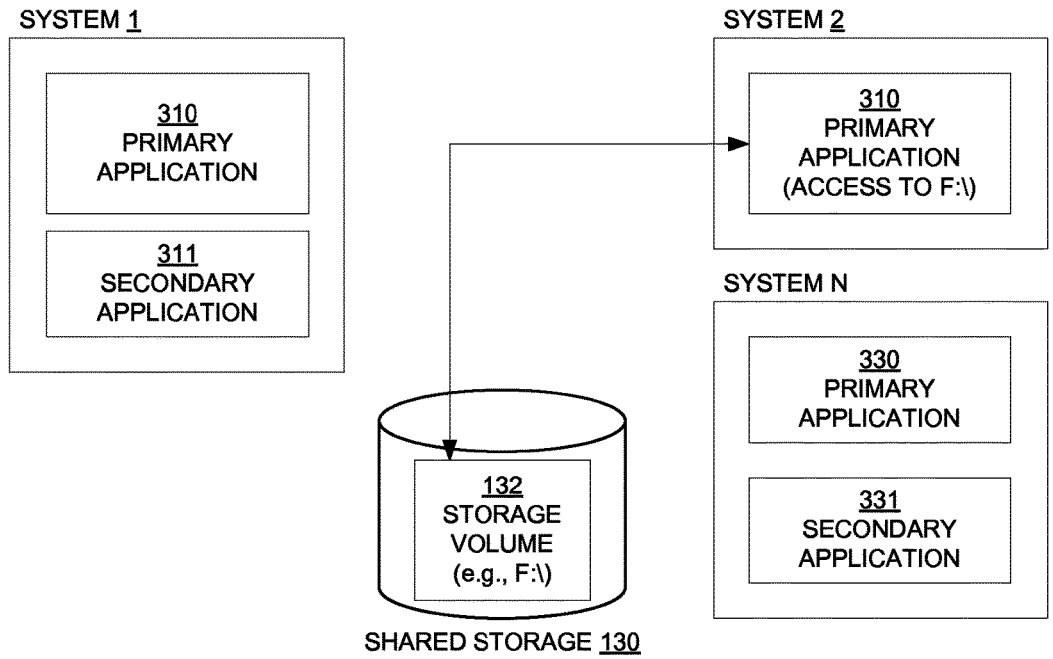

With reference now to FIG. 3C, after the storage volume 132 is remounted, the primary application 310 can failover to system 2. More specifically, in the example of FIG. 3C, the storage volume 132 is remounted as "F:\" on system 2 and the primary application is started on system 2. As a result, the storage volume 132 can be accessed by the primary application 310 (which is now executing on system 2) by any other applications that will run on system 2.

Generally speaking, each of the applications running on the systems 1, 2, . . . , N may be associated with one or more processes. With reference now to the example of FIG. 4, process 1 is associated with the secondary application 311, process 2 is associated with a different application, and process M is associated with yet another application. Where the discussion refers to a single process, that discussion can be readily extended to multiple processes.

Figure 4:
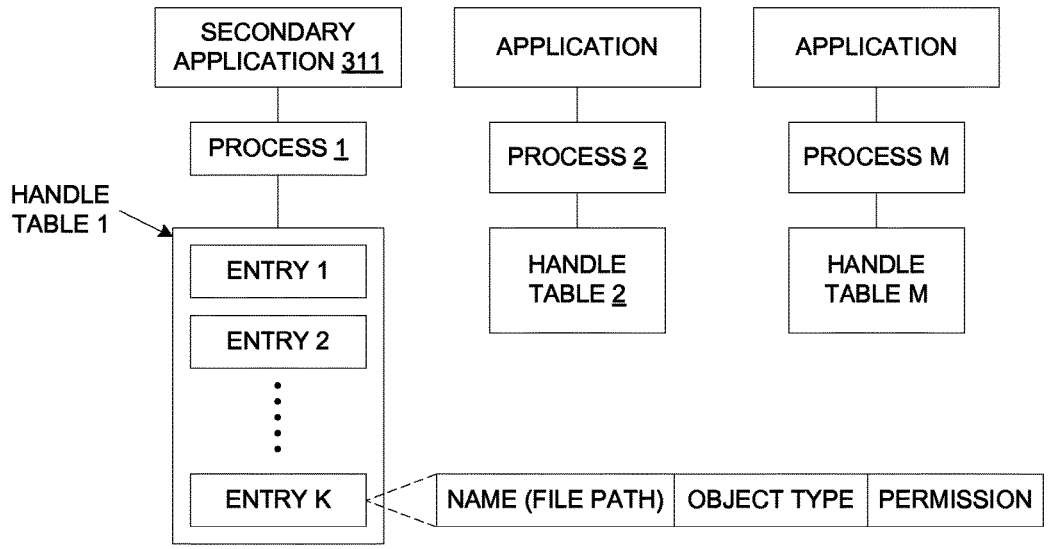
FIG. 4 is a block diagram depicting processes and associated handle tables according to an embodiment of the invention.

An internal handle table is associated with each process. In general, a handle table is an operating system-specific data structure associated with a particular process and identifies (lists) the objects (e.g., executive objects) that are opened by the process. In general, there is a handle table per process per system/node. In the example of FIG. 4, handle table 1 is associated with process 1, which is associated with the secondary application 311 executing on system 1 (FIG. 3A). Similarly, handle table 2 is associated with process 2, which is associated with a different application that is executing on one of the systems (either system 1 or another system) in the clustered network 100 (FIG. 1), and so on.

In one embodiment, each handle table contains a number of entries, and each entry identifies an open handle. For example, handle table 1 includes entries (open handles) 1, 2, . . . , K. Each handle in the handle table for a process corresponds to an object (e.g., an executive object) associated with that process. Thus, handle table 1 includes a list of objects associated with process 1.

As shown in FIG. 4, an entry for an object includes information such as, but not limited to, a unique name associated with the object, an object type, and permission(s) associated with the object. As will be seen from the discussion to follow, objects of the type "file" are of particular interest.

FIG. 5 provides an example of the type of information that may be included in handle table 1 according to an embodiment of the invention. Handle table 1 includes the complete name of an object, the type of object, and associated permissions. For a file type of object, the complete name includes the complete file path, including the identity of the storage volume on which the file resides. In FIG. 5, the complete name/file path is not shown; only the name of the mounted volume is shown. For example, handle 1 is associated with a file type of object that is mapped to "F:\" (the storage volume 132 on shared storage 130 of FIG. 1), and handle 4 is associated with a file type of object that is mapped to a different storage volume "C:\" (not shown in the figures). For a file type of object, the types of permissions may include read only, write only, and read/write (read and write).

Figure 7:
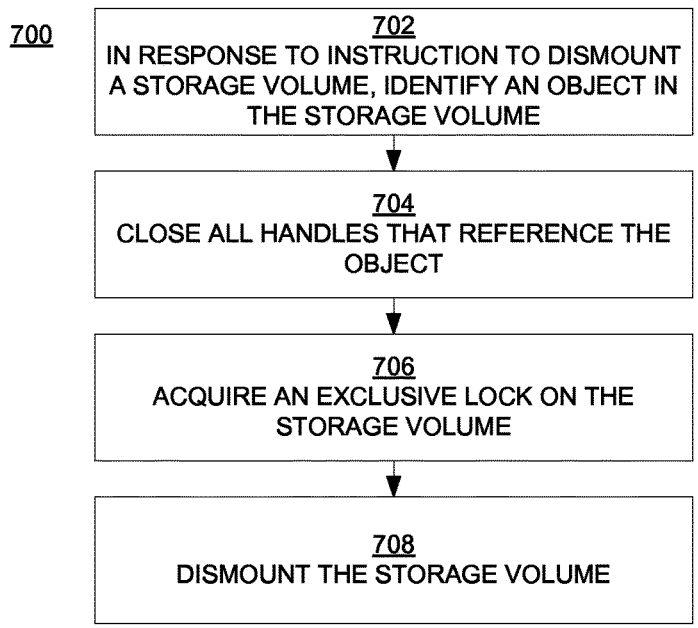
FIG. 7 is a flowchart of a computer-implemented process for dismounting a storage volume according to an embodiment of the invention.
Figure 8:
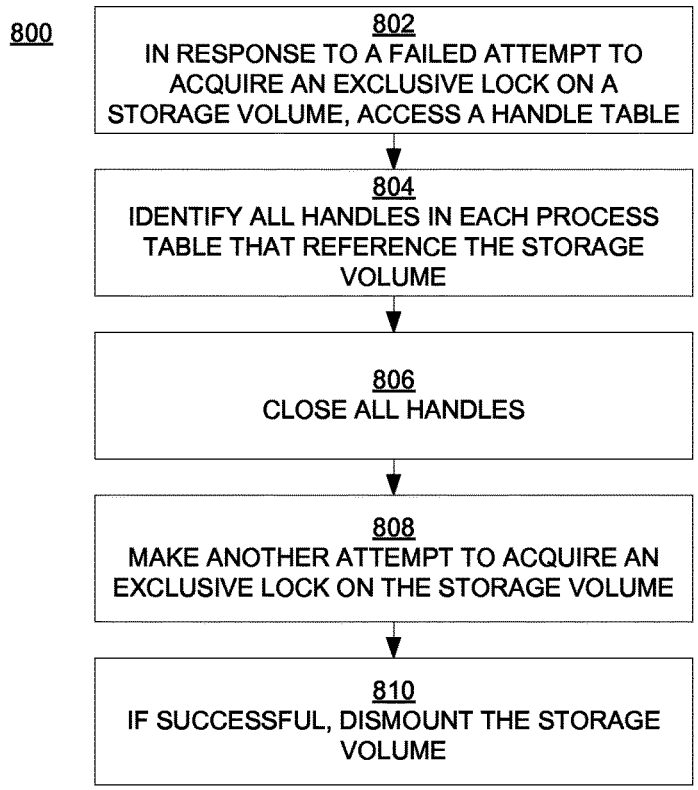
FIG. 8 is a flowchart of a computer-implemented process for dismounting a storage volume according to another embodiment of the invention.

FIG. 6 is a flowchart 600 of a computer-implemented process for dismounting and remounting a storage volume according to an embodiment of the invention. FIG. 7 is a flowchart 700 of a computer-implemented process for dismounting a storage volume according to an embodiment of the invention. FIG. 8 is a flowchart 800 of a computer-implemented process for dismounting a storage volume according to another embodiment of the invention. Flowcharts 600, 700, and 800 can be implemented as computer-executable instructions residing on some form of computer-readable storage medium (e.g., in the system 210 of FIG. 2).

In block 602 of FIG. 6, in one embodiment, the volume file buffer 131 (FIG. 1) is flushed so that all the cached data (e.g., New Technology File System (NTFS) data) is written to the storage volume 132 of FIG. 1 (e.g., the storage volume named "F:\"). This function can be performed in response to a command or instruction issued by an application programming interface (API) provided by the operating system.

In block 604, in one embodiment, an attempt is made to acquire an exclusive lock on the storage volume 132 (F:\). This function can be performed by another API provided by the operating system.

In block 606, if an exclusive lock can be acquired, the flowchart proceeds to block 618. However, if the attempt to acquire an exclusive lock fails, it indicates that there is at least one application/process that is still accessing the storage volume 132 (F:\), in which case the flowchart 600 proceeds to block 608. The API used in block 604 can issue a command or instruction indicating it was unable to acquire the exclusive lock.

In block 608, the internal handle table (FIGS. 4 and 5) for each process on the system where the storage volume 132 is accessed in order to identify objects (e.g., files) that are opened by a respective process. That is, each handle table (FIG. 4) corresponding to a process on system 1 is accessed to determine whether any of the processes are accessing the storage volume 132 (F:\).

In block 610, for each entry (open handle) in the internal handle table for each process on the system, the type of the object represented by the entry is identified. Specifically, entries (handles) identified as type "file" are identified (see FIG. 5). In one embodiment, the handle table is searched only for objects typed as files. File type of objects are of particular interest because those are the objects that access (read from and/or write to) the storage volume 132 (F:\).

In block 612, for each file type of object identified in block 610, the name of the object (e.g., the file path of the open file handle) is determined (see FIG. 5). If a file type of object has a name (file path) that maps to the storage volume 132 (F:\), then that handle is closed. In one embodiment, the granted access permissions (e.g., read mode, write mode, or read/write mode) are also determined.

In block 614, if the name of an object corresponds to a file on the storage volume 132 that is to be dismounted, then the open handle for that object is closed on behalf of the application/process. If a process is accessing files on other storage volumes other than the one that is to be dismounted, then only the handles for those objects on the storage volume to be dismounted (storage volume 132) are closed, leaving the handles to other files on the other storage volumes open. For example, with reference to FIG. 5, handles 1 and 3 are closed because they reference the storage volume 132 (F:\), but it is not necessary to close handle 4 (even though it is associated with a file type of object) because it points to a different storage volume (C:\). An API provided by the operating system can be used to close the appropriate open handles.

If, for some reason, a handle cannot be closed, then the process itself can be terminated. If a process is terminated, it can be restarted after the storage volume 132 is dismounted.

In block 616 of FIG. 6, the corrective actions mentioned above may be logged (recorded) for possible future reference.

The flowchart 600 then returns to block 602. In other words, the file buffer 131 is flushed again so that any NTFS data accumulated while the operations just described were performed is written to the storage volume 132. In block 604, another attempt is made to obtain an exclusive lock on the storage volume 132. If unsuccessful (e.g., because one of the processes opened a new handle), the operations just described are performed until an exclusive lock is acquired.

In block 618, once an exclusive lock is obtained for the storage volume 132, the volume can be dismounted.

In block 620, the storage volume 132 is mounted (re-mounted) and then made available to the failover system/node (e.g., system 2 of FIG. 3C).

According to an embodiment of the invention, there are three possible operating modes. In mode 1, if an exclusive lock on the storage volume 132 is not acquired, then the cluster software aborts the attempt to take that volume offline. Mode 1 then relies on manual intervention and corrective steps. In mode 2, the cluster software gracefully dismounts the storage volume 132 in the manner described by FIG. 6. In mode 3, if an exclusive lock on the storage volume 132 is not acquired, then the storage volume is forcefully dismounted.

With reference now to FIG. 7, in block 702, in response to an instruction to dismount a storage volume, an object in the storage volume 132 (FIG. 1) is identified. Prior to this operation, and in response to the dismount instruction, cached data may be written from the file buffer 131 (FIG. 1) to the storage volume 132, and an initial attempt may be made to acquire an exclusive lock on that volume.

In block 704, a handle that references the object is closed. In one embodiment, one or more handles are closed by first accessing an internal handle table (FIGS. 4 and 5) for each process that is accessing the storage volume 132, by identifying an entry in the handle table that references that storage volume. More specifically, in one embodiment, a file type of object in the handle table is identified, a name for the file type of object is accessed, and a determination is made with respect to whether a file path included in the name corresponds to a file in the storage volume 132. In one embodiment, a log is updated to record that the open handle was closed.

In block 706, an exclusive lock on the storage volume 132 is acquired. Before acquiring the exclusive lock, cached data may again be written from the file buffer 131 to the storage volume 132.

In block 708, the storage volume 132 can then be dismounted. The storage volume 132 is mounted again on a different system/node before failover of the application.

With reference now to FIG. 8, in block 802, in response to a failed first attempt to acquire an exclusive lock on a storage volume, an internal handle table for each process is accessed. Prior to this first attempt, perhaps in response to a dismount instruction, cached data may be written from the file buffer 131 (FIG. 1) to the storage volume 132 (FIG. 1).

In block 804, an entry in an internal handle table (FIGS. 4 and 5) and that references the storage volume 132 is identified. More specifically, in one embodiment, a file type of object in the handle table is identified, a name for the file type of object is accessed, and a determination is made with respect to whether a file path included in the name corresponds to a file in the storage volume 132, as previously described herein.

In block 806, a handle corresponding to the entry in the handle table is closed.

Then, in block 808, a second attempt is made to acquire an exclusive lock on the storage volume 132. Before making the second attempt, cached data may again be written from the file buffer 131 to the storage volume 132.

In block 810, if the exclusive lock is successful, then the storage volume 132 can be dismounted and subsequently mounted (before failover of the application).

In summary, according to embodiments of the present disclosure, a primary application is stopped before a shared storage volume can be dismounted so that an application can be stopped and restarted on another node/system without corrupting the file system. Before dismounting the storage volume and after stopping the primary application, if there are any secondary applications/processes accessing the volume, then their active handles are closed and the volume file buffer is flushed so that the file system remains consistent after the failover. Relative to conventional approaches, the storage volume can be more quickly dismounted because handles for secondary applications are readily identified and closed. Hence, downtime is decreased and the availability of primary (high availability) applications is increased.

Embodiments according to the present disclosure can be used in physical and virtual environments. In addition to failover, embodiments according to the present disclosure can be used for disaster recovery.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:
in response to an instruction to dismount a storage volume in a first node in a network, making an attempt to acquire an exclusive lock on said storage volume;
when said attempt is unsuccessful, then:
accessing an internal handle table for each of a plurality of processes, wherein each of the internal handle tables identifies a plurality of handles;
identifying that a first of the handles references a first object in said storage volume;
closing the first handle that references the first object;
determining that a second of the handles references a second object that is not in said storage volume;
leaving the second handle that references the second object open; and
identifying and closing additional handles referencing additional objects in the storage volume until no such handles remain;
acquiring said exclusive lock on said storage volume after said additional handles have been closed; and
dismounting said storage volume after acquiring said exclusive lock.

2. The computer-readable storage medium of claim 1 wherein said method further comprises, prior to said identifying one of the handles, writing cached data to said storage volume from a file buffer for said storage volume.

3. The computer-readable storage medium of claim 1 wherein:
each of the processes is accessing said storage volume;
each of the internal handle tables comprises a plurality of entries identifying the handles; and
an entry of said entries is identified that references said storage volume, wherein said entry corresponds to said object.

4. The computer-readable storage medium of claim 3 wherein said identifying an entry comprises:
identifying a file type of object in said entries;
accessing a name for said file type of object; and
determining whether a file path included in said name corresponds to a file in said storage volume.

5. The computer-readable storage medium of claim 4 wherein said method further comprises determining access permissions associated with said file.

6. The computer-readable storage medium of claim 1 wherein said method further comprises writing cached data from a file buffer for said storage volume to said storage volume after said identifying and closing additional handles and before said acquiring.

7. The computer-readable storage medium of claim 1 wherein said method further comprises, after said dismounting, remounting said storage volume.

8. The computer-readable storage medium of claim 1 wherein said method further comprises indicating in a log that said handle was closed.

9. The computer-readable storage medium of claim 1 wherein two or more of the plurality of processes are associated with a single application.

10. An article of manufacture including a computer-readable storage medium having instructions stored thereon that, if executed by a computing device, cause said computing device to perform operations comprising:
in response to a failed first attempt to acquire an exclusive lock on a storage volume in a first node in a network, accessing an internal handle table for each of a plurality of processes executing on said computing device, wherein each of the internal handle tables includes entries identifying a plurality of handles;
identifying that a first of the entries references said storage volume;
closing a first handle corresponding to the first entry;
determining that a second of the entries does not reference the storage volume;
leaving a second handle corresponding to the second entry open;
identifying and closing additional handles corresponding to entries that reference the storage volume until no such entries and handles remain;
making a second attempt to acquire said exclusive lock on said storage volume after said additional handles have been closed; and
dismounting said storage volume after acquiring said exclusive lock.

11. The article of manufacture of claim 10 wherein said operations further comprise, prior to said first attempt, writing cached data to said storage volume from a file buffer for said storage volume.

12. The article of manufacture of claim 10 wherein said first attempt is made in response to an instruction to dismount said storage volume.

13. The article of manufacture of claim 10 wherein said operation of identifying an entry comprises:
identifying a file type of object in said internal handle table;
accessing a name for said file type of object; and
determining whether a file path included in said name corresponds to a file in said storage volume.

14. The article of manufacture of claim 13 wherein said operations further comprise determining access permissions associated with said file.

15. The article of manufacture of claim 10 wherein said operations further comprise writing cached data from a file buffer for said storage volume to said storage volume after said operation of identifying and closing additional handles and before said second attempt.

16. The article of manufacture of claim 10 wherein said operations further comprise, after said dismounting, remounting said storage volume.

17. The article of manufacture of claim 10 wherein two or more of the plurality of processes are associated with a single application.

18. A computer system comprising:
a processor; and
a memory coupled to said processor and having stored therein instructions that, if executed by said computer system, cause said computer system to execute a method comprising:
causing data in a file buffer for a storage volume to be written to said storage volume;
before acquiring an exclusive lock on said storage volume:
accessing an internal handle table for each of a plurality of processes, wherein each of the internal handle tables includes entries identifying a plurality of handles;

identifying a first of the entries that references said storage volume;

closing a first handle corresponding to the first entry;

determining that a second of the entries does not reference the storage volume;

leaving a second handle corresponding to the second entry open; and identifying and closing additional handles corresponding to entries that reference the storage volume until no such entries and handles remain;

after said additional handles are closed, acquiring said exclusive lock; and dismounting said storage volume after acquiring said exclusive lock.

19. The computer system of claim 18 wherein said identifying one of the entries comprises:

identifying a file type of object in said internal handle table;

accessing a name for said file type of object; and determining whether a file path included in said name corresponds to a file in said storage volume.

20. The computer system of claim 19 wherein said method further comprises determining access permissions associated with said file.

21. The computer system of claim 18 wherein said method further comprises causing data in said file buffer to be written to said storage volume after said identifying and closing additional handles and before said exclusive lock is acquired.

22. The computer system of claim 19 wherein said method further comprises, after said dismounting, remounting said storage volume.

23. The computer system of claim 18 wherein two or more of the plurality of processes are associated with a single application.

* * * * *